Aug. 6, 1968 A. E. FEINBERG 3,396,342

POWER SUPPLY CIRCUIT FOR CONTINUOUS WAVE MAGNETRON OPERATED BY PULSED DIRECT CURRENT

Filed Aug. 16, 1965 4 Sheets-Sheet 1

INVENTOR

ALBERT E. FEINBERG

By Silverman & Cass

ATTORNEYS

INVENTOR.
ALBERT E. FEINBERG
By Silverman & Cass
ATTORNEYS.

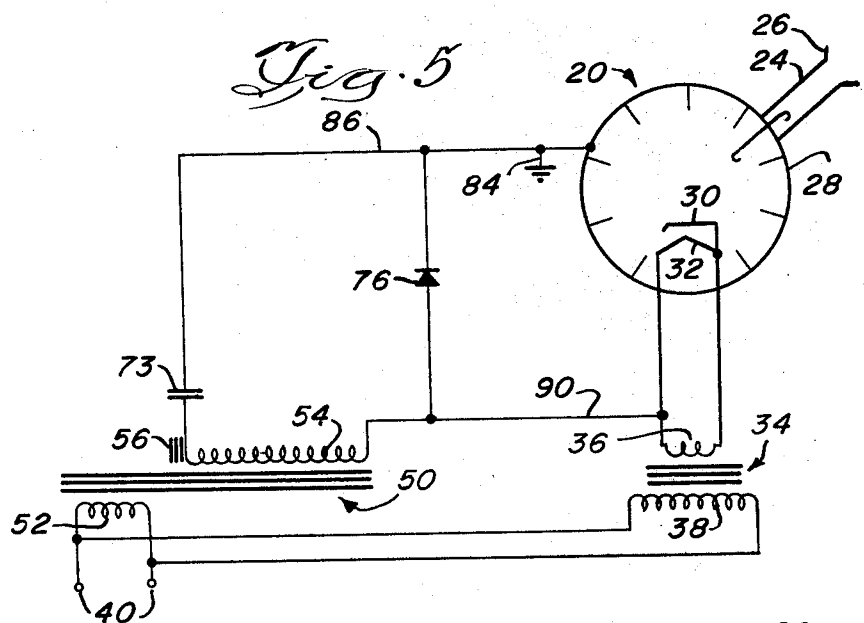
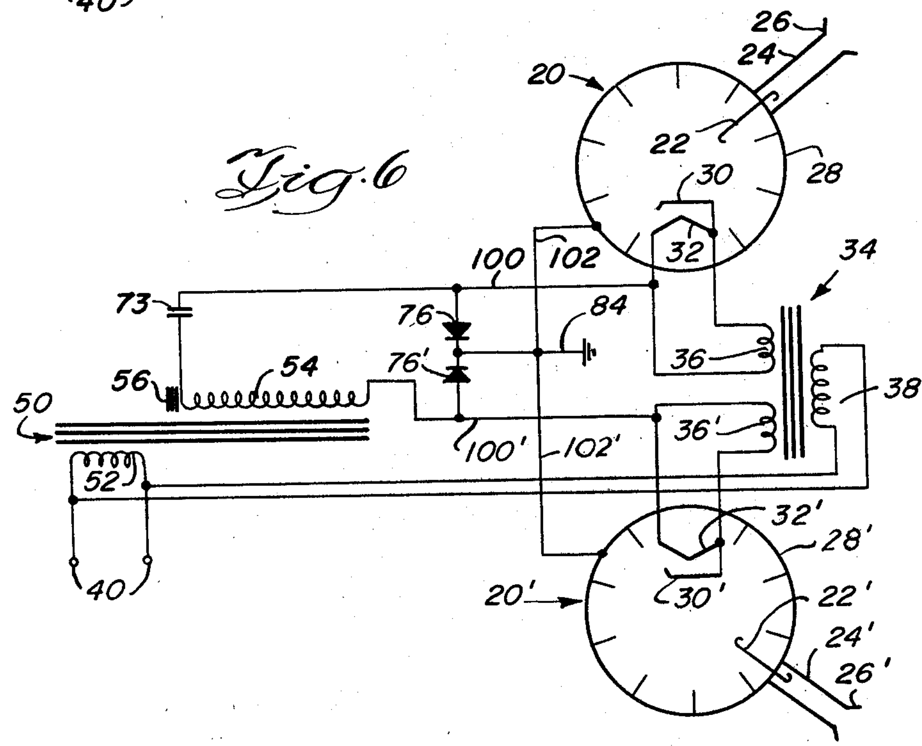
INVENTOR
Albert E. Feinberg
By Silverman + Cass
ATTORNEYS

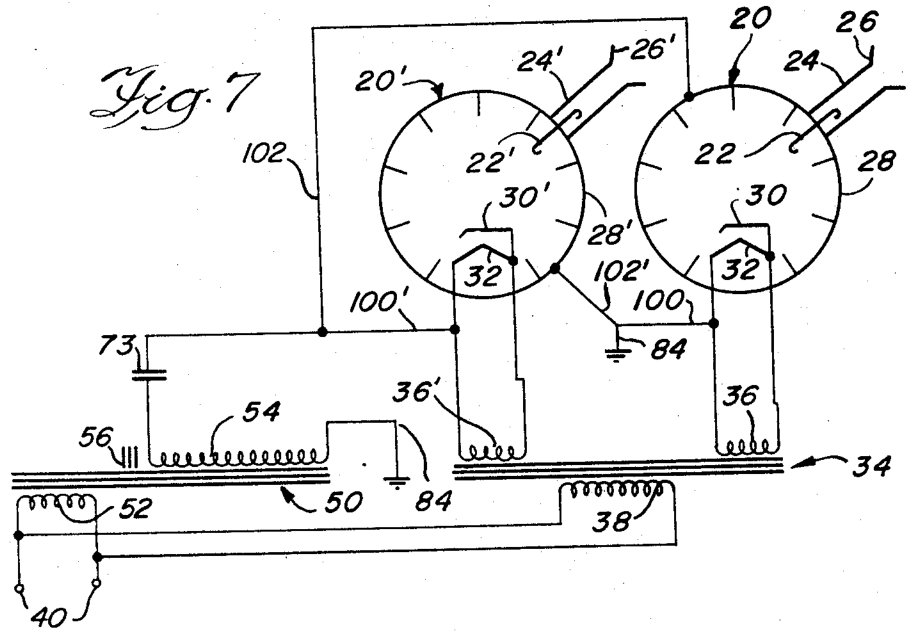
INVENTOR.
ALBERT E. FEINBERG
By Silverman & Cass
ATTORNEYS.

3,396,342
Patented Aug. 6, 1968

3,396,342

POWER SUPPLY CIRCUIT FOR CONTINUOUS WAVE MAGNETRON OPERATED BY PULSED DIRECT CURRENT

Albert E. Feinberg, Chicago, Ill., assignor to Advance Transformer Co., Chicago, Ill., a corporation of Illinois Continuation-in-part of application Ser. No. 450,441, Apr. 23, 1965. This application Aug. 16, 1965, Ser. No. 479,973
24 Claims. (Cl. 328—262)

ABSTRACT OF THE DISCLOSURE

An operating circuit for energizing a magnetron from an A.C. line of relative low voltage and low frequency. The operating circuit has a substantially constant current transformer, a condenser series coupled to the secondary winding of said transformer and return path means through the condenser. The primary and secondary windings of the transformer are electrically isolated from one another and are coupled in a high leakage reactance operating relationship to one another. A magnetic shunt is interposed between the windings of the transformer to provide the desired leakage reactance during operation. The condenser is of such size to cause leading current to flow through the secondary winding to result in saturation of the transformer core. In the preferred embodiment, the return path means consists of a full wave rectifier, which has a pair of input terminals connected to the combination of the secondary winding and the series connected condenser. In this embodiment both half cycles of the alternating current wave are transmitted to the anode of the magnetron. The return path means can also comprise a diode or another magnetron.

This invention relates generally to a power supply circuit for operating a continuous wave magnetron and more particularly is concerned with a power supply circuit which is required to provide a pulsed direct current for the magnetron.

This application is a continuation-in-part of my copending application, Ser. No. 450,441, filed Apr. 23, 1965, abandoned Nov. 29, 1965.

In a basic sense, the invention may be considered an operating system in that the magnetron which is connected in the circuit is under the control and operation of the power circuit which provides the power input to said magnetron. In the principal application to which the magnetron is put in accordance with the invention, the output of the magnetron is in no manner changed, as for example by modulation or the like. Such principal application is in electric ovens, where the high frequency power output of the magnetron is distributed throughout a chamber for cooking food or the like. In such an application, there is no control exerted upon the output, but its character depends fully upon the power supply circuit. As a matter of fact, there is no significant electrical circuitry other than the power circuit.

The invention is not limited to such principal application, but is of broader scope. The magnetron may be used for many other purposes, but no reference will be made to any circuitry herein other than the power supply, which will be included in reference to a magnetron operating system herein.

The invention is not limited to circuits in which there is only one magnetron, but is applicable to multiple magnetron circuits, either where the magnetrons are in use in the same or different locations. For example, one power supply transformer may operate two magnetrons in one oven or two magnetrons in separate ovens.

In considering the use of the magnetron and its operating system for application to heating ovens, there are many important considerations, from a study of which one will conclude that the most important requirements of the system are as follows:

(1) The circuit should have high efficiency to provide the maximum of power output for a given power input.

(2) The system should have high power factor, so that the load provided thereby does not draw inordinately large wattless current from the utility supply lines.

(3) The system should have good regulation, to provide safe and reliable operation.

(4) The apparatus should be simple so as to be easy to manufacture, assemble and service by relatively inexperienced personnel.

(5) The apparatus should be small in size, of light weight and utilize economical components so that the cost of the entire apparatus is low.

Most, if not all of these requirements are not exclusive to systems for operating magnetrons in cooking ovens, but are equally applicable to use in radar, testing microwave equipment, medical devices and general laboratory testing.

Prior magnetron operating systems of the character referred to herein, involved the use of saturable core reactors, silicon controlled rectifiers and complex gating circuits, but none of them, so far as known, have been fully satisfactory in meeting the majority of the requirements set forth above, let alone all of them.

A magnetron is an enclosed device which serves as a source of high frequency energy. The magnetron operates in a high intensity magnetic field, which conveniently is provided by fixed permanent magnets in the case of a system for use in a cooking oven, although electromagnets may be used in certain applications. The oscillations produced in the magnetron are caused by movement of electrons emitted by a heated cathode, these electrons being caused to move in curved or spiral paths within the lobes or cavities of the magnetron because of the magnetic field affecting them. The frequencies produced are dependent upon the geometry of the magnetron and the strength of the magnetic field. The high frequency energy of the magnetron is picked up by a probe extending into the interior of the magnetron in the path of the spiralling electrons and is transmitted to the load by means of wave guides, coaxial cables and the like. In the case of the system for operating an oven, the energy is emitted into the cooking chamber by means of a wave guide and a suitable horn in a manner well known in this art.

Magnetrons are energized by means of pulsed direct current at fairly high voltages, applied to their anodes. In the case of the magnetrons which are referred to in the full-wave rectified examples described hereinafter, the anode-cathode voltage is of the order of 5000 to 6000 volts.

When such a voltage is applied between the anode and cathode of a magnetron, it requires a considerable potential to start the magnetron oscillating, and thereafter current flows with a non-linear characteristic. Although a non-linear device, the magnetron reacts as a positive resistance device in that an increase in voltage results in an increase in current, but the problem of operating and controlling a magnetron is complicated by the fact that small increments of voltage change will result in rather high variations in current.

As indicated above, prior magnetron operating systems were expensive and complex, not efficient, did not have good power factor unless other characteristics were sacrificed, and as a rule did not have the degree of regulation desired by users. In the latter regard, such regulation that could be achieved by the use of saturable core reactors and gating circuits, for example, was minimal, such that complex power transformers were needed which required primary taps for line voltage variations exceeding a few volts. Since line conditions vary greatly from locality to locality, one can appreciate that it is expensive and inconvenient to adjust the operating circuit for each installation. Such systems were also characterized by poor line power factor which limited the power output due to total loading of the circuit. Power factor correction by line condensers was to no avail.

The invention is based upon recognition that the type of control which has heretofore been used, namely attempted voltage control, was impractical. The reason for the difficulties encountered was that since a very small change in voltage, especially in the primary circuit, would result in a great change in the anode current, any control other than one which would be extremely comprehensive could not keep the system operating at any fixed range. According to the invention, the control is exerted as a current control, in the secondary circuit of the transformer used so that large variations in the primary voltage have little or no effect upon the magnetron current. In this way, a great deal of the complexity of prior systems is eliminated.

An important object of the invention is to provide a magnetron operating system in which the magnetron current is controlled through the use of a substantially constant current circuit, so that good regulation is achieved without deleterious effects in the anode circuit of the magnetron.

The advantages which are achieved by good regulation are the elimination of the principal problems of prior circuits. In such prior circuits, assuming that the system has been properly adjusted upon installation, with variations in line voltage one might expect loss of power in the magnetron output circuit if the voltage went down, or the blowing of fuses and/or burning out of expensive components, if the line voltage should rise. As will be seen, the invention not only obviates and untoward occurrences with variations in line voltage, but in addition does not require any adjustments to be made once the apparatus has been manufactured, since it will perform with substantially constant current output over a wide range of primary and hence line voltage.

An object of the invention is to provide a magnetron operating system which practically meets all of the requirements set forth above.

Still another object of the invention is to provide a power supply circuit for energizing one or a plurality of continuous wave magnetrons which requires no saturable core reactors, gating circuits, silicon controlled rectifiers or transistors for achieving the desired control. The value of this object is enhanced when one considers that the voltages and currents which are involved are quite high, and the components are expensive and usually large in size. For example, the dimensions of terminals for a condenser or other component which are intended to handle say—5000 volts—may be materially increased with an increase in the required voltage to 6000 volts.

The circuit of this invention uses a relatively rugged iron core transformer in connection with a series capacitor, the reactance of the transformer and the coupling between the primary and secondary windings being such as to provide substantially constant secondary current output over a wide range of primary voltages. The secondary winding is in series with the capacitor and the circuit is connected across one or more magnetrons. Since the magnetrons must be energized by pulsed D.C. and are inherently uni-directional electronic devices, they may provide their own rectification, but only for those parts of the power cycles applied thereto which make the anodes positive relative to the cathodes. The capacitor must have alternating current flowing therethrough at all times to provide the effect needed for rendering the transformer a substantially constant current device, hence, if only a magntron is connected directly in circuit across the secondary winding there will be no return path for alternate half-cycles. The capacitor will charge up to maximum capacity and will block further flow of current.

According to the invention, return paths are provided for both half-cycles to assure alternating current in the capacitor, and this forms an important object of the invention. Such return paths may comprise the magnetron itself for one half-cycle and a by-pass uni-directional device for the other. Such uni-directional device may be passive, such as a rectifier, or it may be active, such as another magnetron. The preferred form of the invention uses a full-wave rectifier to provide return paths for both half-cycles, while pulsing the magnetron on both half-cycles.

The components mentioned above, namely transformer, capacitor and means to provide a return path for at least one half-cycle of the alternating current wave, are the only components essential to the operation of the system, and will be described in detail hereinafter. As seen, the complex components of prior power supply circuits are not included in the essential system, although conceivably some modified form of the system with sophisticated circuitry could be devised. Where the basic structure of the invention is utilized, the presence of components of a type utilized in prior circuits does not necessarily indicate that the resulting circuit is outside of the scope of the invention. Special effects, sophisticated requirements or some other reasons may motivate the use of structure in addition to the basic circuit, but the basic circuit does not require such components as controlled rectifiers, gating circuits, saturable core reactors or transistors.

An indication of the capabilities of the preferred form of the invention may be obtained by a comparison of its outputs with that of the prior structures. In prior structures operated from the conventional 120 volts A.C. 60 cycle line, the most favorable magnetron current that could be obtained for a given magnetron was about 170 milliamperes, D.C. With the invention the current output of a full-wave circuit is of the order of 250 milliamperes, D.C. for the identical magnetron operating on the identical 120 volt A.C. line with substantially the same line current. The increase in power output is proportionally higher.

Many objects, advantages and features of the invention not specifically mentioned above will become apparent to those skilled in this art as a description of a preferred embodiment of the invention proceeds hereinafter, in connection with which there are illustrated in the drawings, charts and diagrams from an examination of which the invention should be fully understood and apreciated.

In the said drawings:

FIG. 5 is a circuit diagram illustrating a highly simplified form of the invention using only half-wave pulsing of the magnetron.

FIGS. 6 and 7 are circuit diagrams of modified forms of the invention, characterized by the use of a pair of magnetrons in each case.

The invention is characterized by the provision of a high leakage reactance transformer having a primary winding connected to an A.C. line, and having an electrically isolated secondary winding connected in series with a capacitor, and together therewith, connected to the magnetron, with some means to provide return paths for alternate half-cycles of the alternating current, one of which may be the magnetron and its electrical leads. The preferred form of the invention uses a full wave rectifier for both paths so that the magnetron receives two direct current pulses per cycle.

The transformer windings are separated by a magnetic shunt with a high reluctance gap to provide the desired leakage reactance during operation. In the preferred form, the output of the full wave rectifier is connected across the magnetron anode and cathode so as to supply an unfiltered full-wave pulsed direct current to the magnetron. In other forms of the invention, the magnetron receives only half-wave unfiltered direct current pulses. The transformer is constructed so that there will be saturation in the iron core in the vicinity of the secondary winding which carries a leading current, whereby the current output of the secondary winding will tend to remain at a constant value over relatively wide changes of the primary voltage caused by line fluctuations as well as within a wide range of other changes which may occur in the system, as for example—changes in temperature, loading, etc.

The transformer provides an arrangement whereby the leading current drawn due to the presence of the capacitor in the secondary winding circuit is to a large extent compensated for by the magnetizing current drawn by the primary and the reactance due to the shunt so that the resulting power factor is quite close to unity but without sacrificing power output. In the latter regard, the wave shape has a lower crest factor than the current waves of prior devices, so that the current wave form is not sharp or peaked. Some of the damage which may be caused to magnetrons is due to high peak voltage which accompany sharp current pulses. In the case of the invention, when one increases the line voltage, it has been found that instead of increasing the peak current, the pulse crest factor remains low, and the width of the pulse actually increases, thereby giving higher power output without accompanying danger to the magnetron and other components. At line voltages of the order of 130 volts or more, which is quite higher than normal, the current pulses applied to the magnetron develop flat or even dipped peaks, which is highly desirable for reliability and excellent performance of the system.

Figure 1:
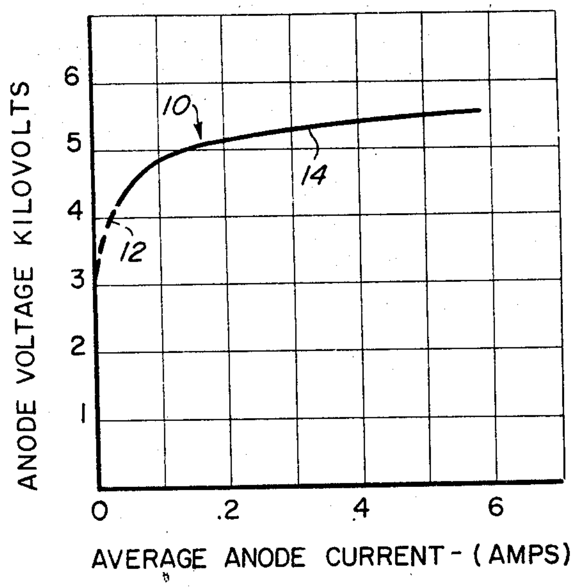
FIG. 1 is a chart showing the anode current versus anode voltage characteristics of a typical continuous wave magnetron of the type used in the system of the invention.

Looking now at FIG. 1, it will be seen that the anode voltage versus current characteristic of a magnetron with pulsed D.C. applied thereto is of such a nature that the current rises rapidly with increase in anode voltage. The oscillation does not commence until the voltage applied to the anode reaches a rather high value, as indicated by the beginning of the curve 10 and since this is not a stable condition when voltage is applied, it is shown as a broken line 12. Assuming the general area of operation, namely at voltages of the order of 5000 or more, the anode current of approximately 250 milliamperes will fluctuate quite rapidly for small changes in voltage.

Consider that the line voltage of about 120 volts A.C. will have to be stepped up 45 times to reach a voltage of 5400 volts in the secondary. With a variation of one volt in the primary there would be a variation of at least 45 volts in the secondary, and since the operation is practically on a horizontal portion of the curve 10, at 14 the variation in current will be quite high. As a matter of fact variations of several hundred milliamperes cannot normally be tolerated. Line variations of several volts are quite usual during each day.

Figure 2:
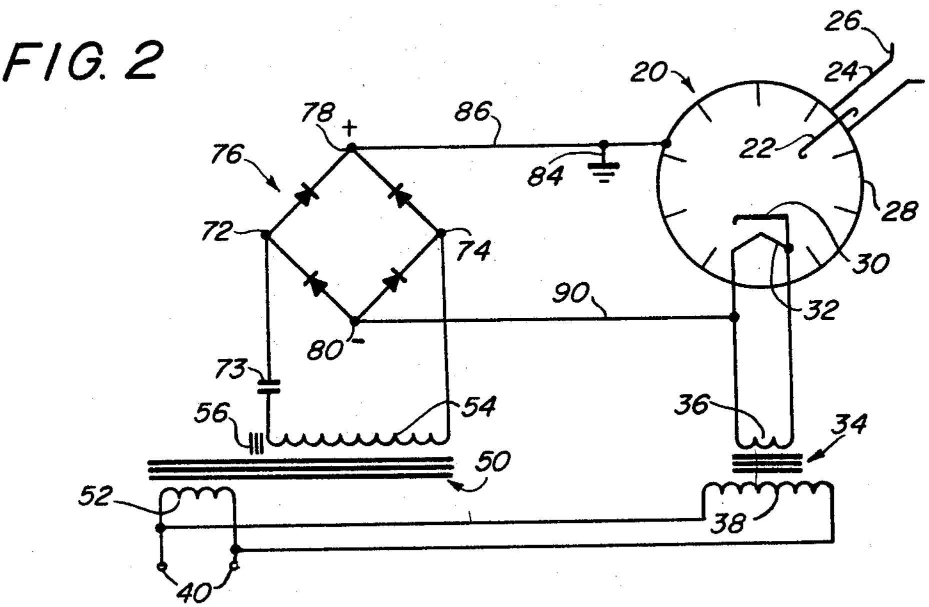
FIG. 2 is a circuit diagram showing a preferred form of the magnetron operating system of the invention in which a full-wave rectifier is used to provide the pulsing for the magnetron.

In FIG. 2 there is illustrated the preferred form of circuit constructed according to the invention. The magnetron is shown diagrammatically at 20, having a pickup probe 22 which feeds a wave guide 24 leading to a horn 26 in the oven (not shown). The wave guide 24 is grounded to the anode 28 and the cathode 30 is heated by a filament 32 that receives its power from a filament transformer 34. The secondary winding 36 of the filament transformer 34 provides a voltage of the order of 4.5 volts A.C. providing perhaps 120 watts to heat the cathode. The primary winding 38 will be connected to a suitable source of A.C. power at 40, this being the utility lines. This is assumed to be in the vicinity of 120 volts, at 60 cycles. A typical magnetron 20 will produce a high frequency field of the order of several thousands of megacycles, sufficient to cook food in a relatively short time if subjected to the energy.

As thus far described, the apparatus is well known, and additionally, it is known to apply a high voltage, say of the order of 5000 volts across the anode 28 and the cathode. In this case the anode is at ground potential.

According to the invention, there is provided a transformer 50 having a primary winding 52 connected to the line 40 by suitable leads. It may be understood that 240 volt lines are not uncommon in domestic as well as industrial service, and the apparatus is easily adapted for this type of service as well as 120 volts A.C. service.

The transformer is of the iron core variety using laminated steel of good electrical grade either stacked or wound. The secondary winding 54 is wound on the core with a loose coupling relative to the primary winding, and this may take the form of physical spacing alone, or physical spacing with a shunt shown at 56. The shunt may be integral with the core or formed as a separate bundle, suitably forced in place.

The core structure is shown and described in connection with FIG. 3. The transformer core of the transformer 50 has a U-shaped shell 60 which provides an outer leg 62, an inner winding leg 64 and a connecting yoke 66. The open end of the shell 60 is closed at a butt joint 67 by a bridging member 68 that completes the magnetic circuit. The core 50 is shown in plane view in FIG. 3, hence it should be appreciated that it is made up of stacked laminations of electrical steel, suitably held together by rivets, clips or clamps, none of which are shown. Likewise, the structure could be formed of steel strip suitably wound to form the core. Variations in the core configuration can also be made, such as utilizing E–I configurations suitably arranged, interleaving E-shaped laminations, etc. Cores may be built with grain-oriented steels, and any of the other materials available at this time.

Figure 3:
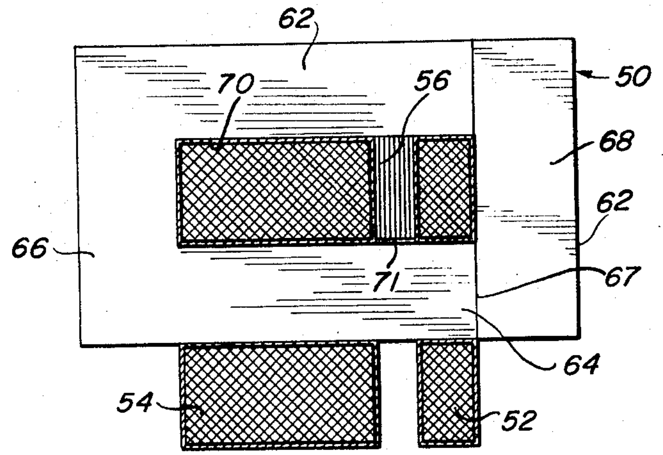
FIG. 3 is a sectional view taken through a transformer constructed for use in the magnetron operating system of the invention.

The structure shown has the dimensions 1½ inches across each of the legs and across the window 70, so that the vertical dimension in FIG. 3 is 4½ inches. The length of the core is 7½ inches including the bridging member 68. In the particular structure described, the stack was chosen at about 2⅜ inches. The primary flux density of this structure was in the vicinity of 18,000 gauss.

The shunt 56 in this case comprised a bundle of laminations of suitable dimensions to be accommodated between the primary and secondary windings. This was ⅝" in the example described. The primary winding 52 was formed of 125 turns of No. 11 (American Wire Gauge) square wire, and the secondary winding 54 had 6100 turns of No. 27 AWG round wire. The high reluctance gap 71 had a width of .125 inch. It may be filled with any suitable gap material.

The secondary winding 54 is connected in series with condenser 73 which, in the example described, had a capacitance of .125 microfarads and must withstand an R.M.S. voltage of over 6200 volts. This latter voltage is measured across the condenser at a primary voltage of 120 volts. Obviously the insulation in the transformer 50 must be suitably chosen.

The secondary winding 54 in this circuit is connected across the terminals 72 and 74 of a full wave rectifier 76. This rectifier will provide return paths for the alternating current wave to the condenser 73 on both half-cycles of each cycle as explained hereinafter. Considering the polarity of the diode symbols of the rectifier, the terminals 78 and 80 will always be positive and negative, respectively, as shown. The positive terminal 78 is connected with ground at 84 by way of the electrical line 86 which is connected to the shell 28 which is the anode of the magnetron 20. The terminal 80 which is always negative is connected by way of the lead 90 to one side of the filament 32 so that the pulsed D.C. provided at the terminals 78 and 80 is connected between the anode and cathode of the magnetron 20. This current is, of course, unfiltered to give distinct positive-going pulses. The polarities of the terminals 72 and 74 alternate with each half-cycle so that opposite arms of the rectifier alternatively furnish the half-cycle return paths to keep the condenser 73 always conducting.

In operation, due to the fact that the secondary winding 54 carries a leading alternating current, there is a tendency of the iron in the vicinity of the secondary winding to become saturated. A great deal of the technique in building and designing a transformer such as 50 lies in adjusting the flux density to provide the degree of saturation during operation and an open circuit which will give the high power factor and efficient operation which are desirable. Such techniques while not believed fully familiar to those in the magnetron circuit art, are well known in the field of building ballasts for gaseous discharge devices.

When saturation occurs in the portion of the iron core which carries the secondary flux, a leading reactive current is reflected in the primary circuit and if this is adjusted to offset the lagging reactance of the primary winding, caused by the inductance of the primary winding and the magnetizing current drawn by the primary, then it is feasible to achieve high power factor in the power provided by the line 40. A relatively simple method of achieving this end is to adjust the physical constants and the characteristics of the circuit until short-circuiting the secondary winding 54 through the condenser 73 will draw the minimum current through the primary winding 52 from the line. The significance of this is that the leading and lagging reactances in the primary circuit at this point are to all intents and purposes balanced. Practically, the constants will require slight adjustment during actual load operation to compensate for load voltage and current.

Figure 4:
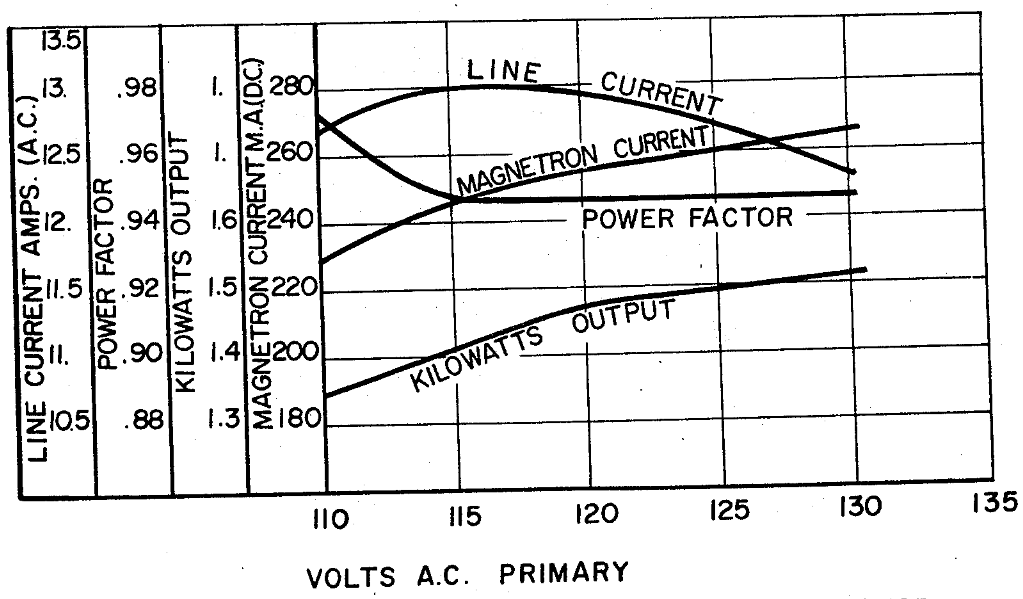
FIG. 4 is a chart showing several characteristics of the system of FIG. 2 while opesating.

The novelty of the invention is enhanced from a study of the characteristics of the system of FIG. 2 as shown in the chart of FIG. 4, which shows the parameters of the circuit during operation. It will be appreciated that the magnetron is basically a positive resistance device, while the gaseous discharge device is a negative resistance device. One would not consider that a structure suitable for regulating the operation of the negative resistance gaseous discharge device would be satisfactory for operating a magnetron. Indeed, it is believed that it has not been known to use a constant current transformer and condenser combination to operate a magnetron, until the advent of this invention. One of the most significant factors which must be considered in the ballast art is the difference between open circuit and operating voltage. For example, the ordinary gaseous discharge device igniting and operating circuit requires its open circuit voltage to be from 50% to as much as 300% greater than its operating voltage. Accordingly, one would not conceive that circuits of the ballast art would be even remotely useful in the arrangement of the invention for operating a magnetron. It is pointed out that the open circuit voltage of the transformer is only a few percent higher than the rectifier operating voltage.

In FIG. 4 there are illustrated four curves, suitably identified. In this case, the circuit was as shown in FIG. 2, with a magnetron of conventional construction. As the line voltage varies between 110 volts A.C. and 130 volts A.C. (which is a considerable variation not likely to be encountered in normal usage), the line current drawn varies less than an ampere, and over the range between 115 and 125 volts, about .3 ampere. The magnetron current in this range of variation varies about 35 milliamperes, but within the normal ten volt range of 115 to 125, the magnetron current varies only about 25 milliamperes.

Power factor is especially good in this structure. Note that but for the extremely low voltage, the power factor stays at .95 for all variations in line voltage. Power follows the magnetron current curve.

What is not apparent from this set of curves is that even at high power conditions, the current waves and hence the voltage pulses to which the magnetron is subjected are not peaked. This is inherent in the type of output one may except from a constant current circuit of this type, and the resulting low crest factor widens the current waves without peaking them.

The details of the system given as an example above are capable of considerable variation. For example, for economy of components one may decrease the stack height, decrease the turns ratio to lower the secondary voltage and hence the capacitor voltage, and use different size condensers. These are matters of design, but do not change the basic concept of the invention. Once the design has been settled, there is no need to provide a plurality of taps on the primary winding for adjustment as in the case of prior systems. Often a single tap is made in the secondary winding providing a few less turns than the total for commercial variations in the components used, especially condensers, but basically this is not needed.

FIGS. 5, 6 and 7 illustrate other forms which the invention may take. They utilize circuit variations which are within the scope of the basic concept. In the case of FIGS. 5, 6 and 7, all of the magnetrons shown receive only one pulse per cycle. Power output per magnetron, compared to the structure of FIG. 2, is less for the identical magnetron.

The circuit illustrated in FIG. 5 is extremely simple and operates on the basis of half-wave rectification accomplished by the magnetron itself. A single diode 76 (or a group of similarly poled diodes connected to act as a uni-directional conducting device) is connected in series with the condenser 73 and together therewith across the secondary winding 54 of the transformer 50. Again the lead 86 is at ground potential by the connection 84, and is connected to the anode or shell 28 of the magnetron 20. The rectifier 76 is poled oppositely to magnetron so that when the lead 86 is positive and the lead 90 negative, current cannot flow through the rectifier 76 but can only flow through the magnetron 20. When, on alternate half-cycles, the lead 86 is negative and the lead 90 is positive, current cannot flow through the magnetron 20, since it is a uni-directional electronic device. On such half-cycles, current freely flows through the rectifier 76, by-passing the magnetron 20. The return paths to the condenser 73 are here provided by the magnetron 20 and its leads on one half-cycle, and by the rectifier 76 on the other half-cycle.

It should be appreciated that the power supply of FIG. 5 is providing pulsed D.C. to a D.C. device, and that the benefits and advantages of the invention are made available notwithstanding only one power pulse per cycle is available. On alternate half-cycles the current flows through the by-pass circuit and is dissipated in the total impedance of the portion of the circuit involved. The said benefits and advantages are achieved by the use of a constant current transformer which includes the series condenser 73. Without the by-pass rectifier 76 the condenser would charge up as current flowed through the magnetron in one direction on one half-cycle, and would retain this charge on the next half-cycle, since the magnetron would present a very high impedance to flow of current in the opposite direction.

The principle of providing a by-pass for the magnetron may be used in circuits where efficiency of operation is not as important as economy of components and simplicity. In such cases, the rectification required for providing the pulsed D.C. is provided by the magnetron itself.

In FIG. 6 there is illustrated a circuit in which there are two magnetrons 20 and 20′ served by a single transformer 50 and in which a single secondary circuit is provided having the condenser 73 connected in series with the secondary winding 54. The magnetrons in this case are operated in what may be termed a "push-pull" manner, that is, each is energized on alternate half-cycles. The shells 28 and 28′ are both grounded by leads 102 and 102′, respectively, to the ground 84. The magnetron filament circuits are isolated, however, by providing separate filament windings 36 and 36′ on the transformer 34, energized by the single primary winding 38. The left-hand terminal of the secondary winding 54 is connected through the lead 100 to the filament 32 and is by-passed to ground through the rectifier 76, poled in a polarity reverse of the magnetron 20. The right-hand terminal of the secondary winding 54 is connected through the lead 100′ to the filament 32′ and is by-passed to ground through the rectifier 76′ poled in a polarity reverse of the magnetron 20′.

The operation of the power supply circuit of FIG. 6 is similar to that of FIG. 5, except in this case, there is a power pulse in opposite magnetrons on the opposite half-cycles. Thus, assume that the line 100 is positive and the line 100′ is negative on one half-cycle. Current cannot flow through the magnetron 20 because its cathode and anode, effectively are both positive, nor can it flow through the rectifier 76′ because of the polarity of the latter. It can, however, flow through the rectifier 76, thereby by-passing the magnetron 20, and it can flow through the magnetron 20′. The circuit may be traced from the left terminal of the secondary winding 54 through the series condenser 73, lead 100, rectifier 76, lead 102′, anode 28′ of magnetron 20′, cathode 30′, lead 100′ back to the right-hand terminal of the secondary winding 54. On the next half-cycle when the polarity is reversed, the magnetron 20′ is by-passed, the rectifier 76 carries no current, and the half-wave provides power in the magnetron 20.

In the structure of FIG. 6, each magnetron operates on only one half-cycle, but there is no loss of power in the total circuit on alternate half-cycles, as in the case of FIG. 5. Two magnetrons are required, however.

In FIG. 7, there is illustrated a power supply circuit also using two magnetrons, 20 and 20′, but in this case, the magnetrons by-pass one another. In other words, if the circuit of FIG. 5 had a magnetron in place of the rectifier 76, the result would be the circuit of FIG. 7. Again, as in FIG. 6, the cathodes 30 and 30′ are energized by separate filament windings 36 and 36′ respectively. Operation is similar to that of FIG. 5. When the left-hand terminal of the secondary winding 54 is positive, the shell 28 is positive because of the lead 102 being connected thereto. The right-hand terminal of secondary winding 54 is connected to ground 84 and thence by the lead 100 to the filament 32 and cathode 30. Accordingly, for this half-cycle, the magnetron 20 will oscillate. The magnetron 20′ on the hand cannot conduct during this half-cycle because its cathode 30′ is positive and its anode 28′ is negative.

When the next half-cycle occurs and the polarity is reversed, the magnetron 20′ conducts and the magnetron 20 cannot conduct.

In the above circuit, the need for rectifiers is eliminated since each magnetron provides the needed rectification and the needed by-pass for alternate half-cycles, but the magnetrons must be constructed to withstand the reverse voltages produced.

It will be appreciated that the transformer of FIG. 3 may be used in various forms in each of he circuits described, and that other transformer structures may be used as well, providing the said transformers are connected as constant current circuits, using series condensers for the purposes described. Obviously, where required, as taught herein, the rectifiers may be used to change the alternating current to pulsed direct current or to provide needed by-pass paths to assure that the capacitor has current flowing through it in order to exert its influence on the transformer circuit. Likewise, the magnetron provides its own rectification or may be used dually as a by-pass and as well to furnish power. Multiple magnetron circuits can be constructed in accordance with the invention.

Reference herein to the phrase "constant current" should be considered to mean current regulation in a practical sense. While an ideal situation would indicate that there should be no variation in magnetron current whatsoever over the entire range that the line voltage may vary, this is not necessary. The characteristics illustrated in FIG. 4 show a slight increase in magnetron current with increase in line voltage, which is fully acceptable in practical circuits because it places no undue stress upon the magnetron or other components of the circuit. Performance is excellent. The invention herein provides a power supply which can provide varying degrees of current regulation, depending upon the requirements of the circuit. For example, a much better constancy of current could be achieved by increasing the secondary voltage, but as indicated, the cost of components which must be designed to withstand the resulting higher voltages increases to a degree which may not be justified. The resulting increased degree of regulation may not be needed by the circuit.

The advantage of the invention is that it provides a high degree of flexibility in the variation of circuit constants to enable adjustment to different conditions. It is pointed out, as a further example, that in the characteristics illustrated in FIG. 4, the curve representing power factor is excellent, remaining at a steady high value above a primary voltage of 115. Aside from the fact that this is an excellent and highly desirable condition which is achieved in addition to the good regulation of the current, where such good power factor is not as important as other characteristics, the circuit constants may be varied to achieve increased benefits in other regards.

Many variations are capable of being made without departing from the spirit or scope of the invention as defined hereinafter.

What it is desired to secure by Letters Patent of the United States is:

1. An operating circuit for energizing a magnetron from an A.C. line of relatively low voltage and low frequency which comprises:

(a) a magnetron having an anode and a cathode, (b) a constant-current transformer and condenser means combination which comprises:

(i) a step-up transformer having a primary winding connected to said A.C. line, (ii) a secondary winding isolated from said primary winding but coupled in high leakage reactance operating relation to said primary winding, and (iii) condenser means connected in series with said secondary winding, (c) the anode and cathode of said magnetron being connected to said combination to be subjected to the output voltage thereof, and (d) means providing return paths for current through said condenser means on alternate half-cycles of said voltage output, the current output of the secondary winding under load being maintained at a substantially constant current notwithstanding normal variations in line voltage.

2. An operating circuit as claimed in claim 1 in which the last means comprise a full-wave rectifier having input and output terminals with the combination being connected across the input terminals and the magnetron connected across the output terminals.

3. An operating circuit as claimed in claim 1 in which said last means comprise a rectifier connected across said combination and providing a return path by-passing said magnetron poled opposite to the magnetron.

4. An operating circuit as claimed in claim 1 in which said last means comprise a second magnetron connected across said combination and providing a return path poled oppositely to the first magnetron.

5. An operating circuit as claimed in claim 1 in which there is a second magnetron also connected in a push-pull manner to the said combination and second means providing return paths for current through said condenser means on alternate half-cycles of said voltage output.

6. An operating circuit as claimed in claim 5 in which each of said means providing return paths includes a rectifier connected across the cathode and anode of the respective magnetrons.

7. An operating circuit as claimed in claim 6 in which the rectifiers are poled opposite to one another in a circuit loop which includes the rectifiers in series, the condenser means, and the secondary winding, whereby each magnetron will conduct on different alternate half-cycles.

8. An operating circuit for energizing a magnetron from an A.C. power line of relatively low voltage and low frequency which comprises:

(a) a full wave rectifier having input terminals and poled positive and negative output terminals, (b) a continuous wave magnetron having an anode and a heated cathode with the positive terminal connected to said anode and the negative terminal connected to the cathode, (c) a constant current transformer including a primary winding connected to said power line and a secondary winding connected to said input terminals with a condenser in series with the secondary winding, the windings being electrically isolated from one another, the current output of the secondary winding under load being maintained at a substantially constant value notwithstanding variations in the line voltage.

9. An operating circuit as claimed in claim 8 in which the primary and secondary windings are loosely coupled one relative to the other to provide a high leakage reactance therebetween.

10. An operating circuit as claimed in claim 8 in which said constant current transformer has an iron core with a closed loop magnetic circuit including a winding leg, the windings are arranged coaxially spaced on said winding leg with a magnetic shunt including a high reluctance gap disposed therebetween, said shunt extending across the closed loop magnetic circuit, whereby a high leakage reactance is developed between the windings during operation, the core saturating in the vicinity of the secondary winding during operation to a degree which varies directly as the input voltage so as to maintain said substantially constant current.

11. An operating circuit for energizing a magnetron from an A.C. power line at a low frequency which comprises:

(a) a constant current power transformer having an iron core and primary and secondary windings mounted on said core, said windings being electrically isolated from one another and loosely coupled to provide high leakage reactance during operation, (b) a full wave rectifier having a pair of input terminals, one terminal being connected directly to a terminal of said secondary winding, and the second input terminal being connected through a condenser to the other terminal of said secondary winding, said rectifier having positive and negative poled output terminals, (c) a magnetron having an anode connected to the positive terminal of the rectifier and a heated cathode connected to the negative terminal of the rectifier, (d) and lead means for extending electrical connection from said primary winding to said A.C. power line.

12. In a magnetron power supply circuit including a continuous wave magnetron having an anode and cathode, adapted to be connected to a source of low frequency A.C. power subject to line variations, means for operating the magnetron at substantially constant current at a high power factor, comprising: a high leakage reactance, constant current iron core transformer having primary and secondary windings, the primary winding adapted to be connected to said source, a full wave rectifier having input and output terminals with the input terminals connected across the secondary winding and there being a condenser in series with the secondary winding, and means for connecting the rectifier output terminals to the magnetron anode and cathode respectively to apply a full wave pulsed direct current to said magnetron.

13. The means of claim 12 in which there is a magnetic shunt including a high reluctance gap between the primary and secondary windings and the iron core is of a construction to produce saturation in the portion thereof threaded by the secondary flux during operation.

14. The means of claim 12 in which the constants of the transformer and condenser are chosen so that when the secondary winding is short circuited through the condenser and excluding the rectifier, and the primary winding is connected to said source, at rated line voltage a relatively low current will be drawn from the source.

15. A system for energizing a magnetron for use in a cooking oven or the like which comprises:

(a) a source of A.C. power of relatively low frequency, (b) a magnetron having an anode and a cathode, (c) an iron core transformer having (i) a primary winding connected to said source, (ii) a secondary winding electrically isolated from the primary winding and having a substantially greater number of turns than said primary winding, (iii) a magnetic shunt including a high reluctance gap disposed between the windings so as to produce high leakage reactance during operation of the transformer, (d) a condenser in series with the secondary winding of a capacitance to cause leading current to flow through the secondary during operation with resulting saturation in the transformer core, (e) a full wave rectifier having a pair of input terminals connected to the secondary winding and in series with the condenser, and having negative and positive output terminals, and (f) a connection from the positive terminal to the magnetron anode and a connection from the negative terminal to the magnetron cathode.

16. A magnetron power supply circuit, comprising the combination of a high leakage reactance, constant current, iron core power transformer having a primary and a secondary winding in transformer step-up relationship, with a full wave rectifier and a condenser, the condenser being in series with the secondary winding and the rectifier having input terminals connected across the secondary winding and poled output terminals adapted to be connected directly to the magnetron, the primary winding adapted to be connected to a source of A.C. power at low frequency.

17. A magnetron energizing system comprising:

(a) a magnetron having an anode and a heated cathode, and means for coupling said magnetron to a load for using the oscillatory energy produced by said magnetron, (b) a source of A.C. power of relatively low voltage and low frequency, (c) a first power transformer having a first primary winding connected to said source and a first secondary winding in step-down transformer relationship, (d) a heater associated with the cathode, and the first secondary winding of said first transformer being connected to said heater to energize same, (e) a second power transformer of ferromagnetic core construction and having (i) a second primary winding connected to said source, (ii) a second secondary winding electrically isolated from said second primary winding and in voltage step-up relation thereto, (iii) a magnetic shunt including a high reluctance gap disposed between the second windings so as to produce a high leakage reactance during operation of said second transformer, (f) a condenser in series with the second secondary winding, and of a capacitance to cause leading current to flow through the second secondary winding during operation of said system, (g) a rectifier having a pair of input terminals connected to the second secondary winding and in series with said condenser and having a negative terminal and a positive terminal, (h) a direct connection from the positive terminal to the anode, and (i) an electrical connection from said negative terminal to said cathode.

18. A system as claimed in claim 17 in which the heater is electrically connected to the cathode of the magnetron, and the negative rectifier terminal is connected to the first secondary winding.

19. A system as claimed in claim 18 in which the positive terminal is at ground potential.

20. A magnetron power circuit for providing pulsed alternating current to said magnetron, comprising the combination of a high leakage reactance, constant-current output, iron-core power transformer having a primary winding and a secondary winding in voltage step-up relationship and condenser means with a magnetron having anode and cathode connected respectively to the terminals of said secondary winding with the condenser means comprising a portion of series loop circuitry including the magnetron and secondary winding, and means connected across the magnetron providing a return path through the condenser means at least on alternate half-cycles of current.

21. The combination of claim 20 in which the last means comprises at least one rectifier.

22. A magnetron power supply for supplying pulsed D.C. power to a magnetron from an A.C. power source, comprising: a high leakage reactance substantially constant current transformer having a primary winding and a secondary winding, the primary winding being connected to said A.C. source, a loop circuit having the secondary winding, capacitive reactance means and rectifier means in series in said loop, and a magnetron connected across a portion of said loop which includes only said rectifier means therein, the relative polarities of the magnetron and rectifier means being arranged to provide the pulsed D.C. required for operating said magnetron.

23. A power supply as claimed in claim 22, in which there is a second loop circuit, said secondary winding is common to both loop circuits, said loop circuits both have said capacitive reactance means therein, said second loop circuit has second rectifier means therein connected in a push-pull manner, and in which said magnetron is connected across portions of both loops including only said rectifier means.

24. A power supply as claimed in claim 23, in which the rectifier means of both loops are connected in parallel.

References Cited

UNITED STATES PATENTS

| | | | |
|---|---|---|---|
| 1,530,648 | 3/1925 | Casper | 336—160 |
| 1,995,652 | 3/1935 | Reichard | 336—160 |
| 2,118,137 | 5/1938 | Bartlett | 336—160 |
| 2,222,620 | 11/1940 | Klemperer | 328—210 |
| 2,543,887 | 3/1951 | Brown et al. | 328—268 |
| 2,737,586 | 3/1956 | Flower | 328—172 |
| 2,827,565 | 3/1958 | Weil | 328—262 |
| 2,970,278 | 1/1961 | Reaves | 328—267 |
| 3,174,076 | 3/1965 | Michalski | 328—210 |
| 3,243,651 | 3/1966 | Feinberg et al. | 336—160 |
| 3,265,850 | 8/1966 | Crapuchettes | 328—253 |

ARTHUR GAUSS, *Primary Examiner.*

H. DIXON, *Assistant Examiner.*

PO-1050
(5/69)

UNITED STATES PATENT OFFICE

CERTIFICATE OF CORRECTION

Patent No. 3,396,342 Dated August 6, 1968

Inventor(s) A. E. FEINBERG

It is certified that error appears in the above-identified patent and that said Letters Patent are hereby corrected as shown below:

Column 13, line 29, change "alternating" to --D.C.--.

SIGNED AND SEALED

OCT 27 1970

(SEAL)
Attest:

Edward M. Fletcher, Jr.
Attesting Officer

WILLIAM E. SCHUYLER, JR.
Commissioner of Patents